L. S. GLOVER.
COLOR PHOTOGRAPHY.
APPLICATION FILED JULY 16, 1912.
1,088,412.
Patented Feb. 24, 1914.
Fig. 1
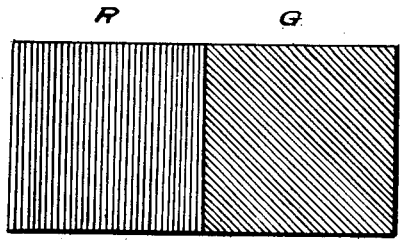
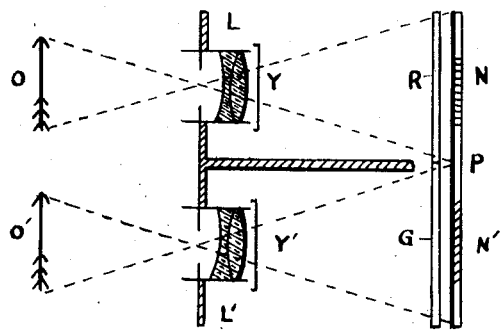
Fig. 2
Fig. 3
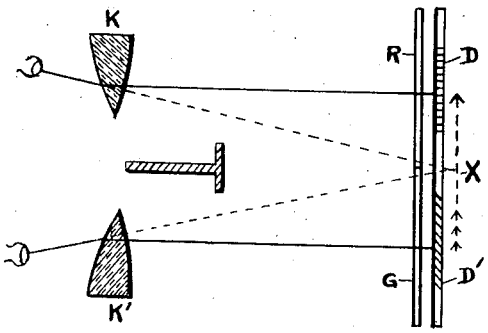
Witnesses:
J. Edwin Giles
C. A. Brineman
Inventor:
Lycurgus Solon Glover

UNITED STATES PATENT OFFICE.

LYCURGUS SOLON GLOVER, OF DETROIT, MICHIGAN.

COLOR PHOTOGRAPHY.

1,088,412.     Specification of Letters Patent.     Patented Feb. 24, 1914.

Application filed July 16, 1912. Serial No. 709,805.

*To all whom it may concern:*

Be it known that I, LYCURGUS SOLON GLOVER, a citizen of the United States, residing at Detroit, in the county of Wayne and State of Michigan, have invented new and useful Improvements in Color Photography, of which the following is a specification.

This invention relates to the process of making color records by means of color screens and pan chromatic plates or films, and has for its purpose to render the process more expeditious and cheaper.

I employ but one exposure, producing one pair of stereoscopic color-record negatives, from which any number of color-record stereograms may be reproduced with economy and despatch.

I will now proceed to describe my invention in detail, reference being had to the accompanying drawings, like letters indicating like parts.

First I prepare two color screens which I shall hereinafter designate as red and green filters. These filters I determine by dividing the spectrum into four fundamental colors, viz:—crimson, yellow, green and blue, by a mixture of which, in suitable proportions, any color in nature can be matched or reproduced. The hues of these four fundamental colors: red, yellow, green and blue, I group into one pair of compound colors, viz:—yellow-red, and blue-green so that when the elements of these two compound colors are mechanically mixed as pigments, or stains, they produce black, while the effect of their optical combination when viewed by transmitted or reflected light through a pair of binocular stereoscopic prisms is to cause them to fuse into one even grayish combination, producing a sensation of white light. With such a pair of filters: one of yellowish red, the other of bluish green I am provided with an extremely sensitive chromatic balance, susceptible to all rays of the spectrum or to any degradation of the same when applied in the manner hereinafter specified. Through the instrumentality of an ordinary stereoscopic camera and a panchromatic plate or film, I make a stereoscopic pair of color-record negatives of any object, one image of which is formed by the rays of light passing through the red filter and the other image of which is formed by the rays passing through the green filter. To compensate for the oversensitiveness of the present panchromatic emulsions to the ultra-violet rays I may employ a third screen, or filter of yellow color but adapted to the said plate, to subdue the violet rays passing the lens system as hereinafter indicated.

From this negative, which constitutes the pair of color-records, I may make any number of transparencies, or diapositives, by contact printing or otherwise in a well known manner, any one of which, when properly mounted, constitutes a faithful color-record-stereogram of the object photographed. These stereograms may be viewed or projected through the filters by which the negatives were made—or a like pair of filters by means of any of the well known stereoscopic apparatus, when a photograph of the original object will appear in all its beauty of atmosphere, distance, solidity and color.

The chromatic filters R and G, serve, First: to split up the pair of stereoscopic images presented by the lens-system into two monochromatic color records. Second, and lastly: to combine and reconstruct, by stereoscopic vision, the two monochromatic images of the diapositive into original form and color.

In the accompanying drawings:—Figure 1 is a general view of my chromatic balance filters, R and G. Fig. 2 is a plan view of the lens system of the well known stereoscopic camera, provided with my system of filters. Fig. 3 is a plan view of the well known stereoscope, also provided with my system of filters.

In Fig. 2 O, O′ indicates the object to be photographed; L, L′ the lens system; Y, Y′ the compensating screens; R, G the filters; P the panchromatic plate or film; N, N′ the color record negative.

In Fig. 3 K, K′ indicate the viewing prisms; D, D′ the diapositive color record stereogram; R and G the filters; X the positive of the image as reconstructed.

I do not confine myself to this particular form of apparatus, since it is obvious that any of the known stereoscopic apparatus may be substituted, or the record negative may be converted directly into a positive by reversal, before fixing, in a well known manner.

I am aware that color record negatives and transparencies have heretofore been made through the instrumentality of color screens and panchromatic plates. I therefore do not claim broadly the art of producing such records.

I do claim, however, and desire to protect by Letters Patent—

1. In a stereoscopic apparatus for producing photographic images in substantially their natural colors, the combination with a stereoscopic pair of lenses, of an orange-red filter, arranged to coöperate with one of said lenses, and a bluish-green filter arranged to coöperate with the other lens, so as to filter the light, passing through said lenses substantially as set forth.

2. In a stereoscopic apparatus for producing photographic images in substantially their natural colors from a single stereoscopic pair of photographic prints, comprising a film having two independent monochromatic color value images, one of said images having an orange-red color value and the other having a bluish-green color value, the combination with a stereoscopic lens system; of an orange-red filter and a bluish-green filter, said images and filters placed axially to the oculars and adapted to present to the eyes, in the fusing of said images and filters, a sensation of one image in approximately natural relief and color, substantially as set forth.

In testimony whereof I have signed my name to this specification in the presence of two subscribing witnesses.

LYCURGUS SOLON GLOVER.

Witnesses:
J. EDWIN GILES,
C. R. BRENEMAN.